UNITED STATES PATENT OFFICE.

ALEXANDER B. ALLEN, OF CINCINNATI, OHIO.

MANUFACTURE OF SUBSTITUTES FOR HARD RUBBER.

SPECIFICATION forming part of Letters Patent No. 229,794, dated July 13, 1880.

Application filed June 1, 1880. (No model.)

*To all whom it may concern:*

Be it known that I, ALEXANDER B. ALLEN, of Cincinnati, in the county of Hamilton and State of Ohio, have invented certain new and useful Improvements in the Manufacture of Substitutes for Hard Rubber; and I do hereby declare the following to be a full, clear, concise, and exact description thereof, sufficient to enable others skilled in the art to which it relates to make and use it.

Owing to the expense of employing hard rubber for the manufacture of various articles of trade, and for general use in the arts, it has long been desirable to provide a cheap substitute for the hard rubber which shall possess some of its qualities, such as hardness, flexibility, color, brightness of surface, and capacity for resisting the corrosive action of acids. Many attempts have been made to produce such substitutes as shall possess these qualities, but thus far without wholly satisfactory results, although several of the qualities mentioned have been obtained.

My invention has for its object to provide a complete substitute for hard rubber, and in furtherance of this object I have invented a process by which hard wood may be treated to produce the desired results.

In carrying out my invention I take ebony, beech, hickory, or other hard wood, either before or after it is shaped into the required form for use, and treat it, in a suitable vessel, with resin-oil under a slow heat for about forty-eight hours. This slow process of treatment at a low temperature fills the pores of the wood with the resin-oil, which afterward, when the wood is dried, hardens therein and cements the fibers into a homogeneous mass, rendering the wood tough and flexible, and fitting it, if unshaped, to be formed into syringe-nozzles, couplings, telephone-cases, knobs and handles, and many other articles for which hard rubber is now employed.

The wooden articles thus treated are afterward coated with a solution of gutta-percha, which is vulcanized on the wood, the coating being made of any desired thickness.

When dry the surface of the articles will be hard and smooth, possessing a fine black polished appearance, and, owing to the gutta-percha, will resist the action of acids and form a non-conductor of electricity.

Having thus described my invention, what I claim is—

1. The process of treating hard wood and articles made therefrom with resin-oil at a slow heat, and afterward coating them with a solution of gutta-percha vulcanized on the wood, substantially as described, for the purpose specified.

2. An improved manufacture—hard-wood articles of use treated by the means and process herein described.

In testimony of which invention I have hereunto set my hand this 29th day of May, A. D. 1880.

ALEXANDER B. ALLEN.

Witnesses:
E. H. BAKER,
N. K. ELLSWORTH.